Dec. 18, 1962  G. W. NILSSON  3,069,053
CAULKING GUN

Filed April 4, 1958  2 Sheets-Sheet 1

INVENTOR.
GUSTAV W. NILSSON
BY
*Fay & Fay*
ATTORNEYS

Dec. 18, 1962  G. W. NILSSON  3,069,053
CAULKING GUN
Filed April 4, 1958  2 Sheets-Sheet 2

INVENTOR.
GUSTAV W. NILSSON
BY
ATTORNEYS

United States Patent Office 3,069,053
Patented Dec. 18, 1962

3,069,053
CAULKING GUN
Gustav W. Nilsson, Mountain View Drive,
Mentor 2, Ohio
Filed Apr. 4, 1958, Ser. No. 726,487
7 Claims. (Cl. 222—391)

This invention relates to a caulking gun adapted to dispense and spread caulking material along wall crevices and the like. More particularly, the invention relates to certain caulking gun improvements and the method of manufacturing and operating the same.

The use of manually operated caulking guns having a hand grip and a lever operated by hand to spread plastic caulking material along surfaces to be filled is well known in the art. In some instances, a cartridge of caulking material is inserted in the barrel of the gun while in other instances bulk caulking material is used. I have discovered that by using my invention the caulking compound may be either in bulk form or disposed in a cartridge.

Therefore, an object of the invention is to provide an attachment for a caulking gun which enables the gun to operate satisfactorily either with bulk or cartridge type caulking material.

Another object is to provide a readily attachable and detachable sealing ring member adapted to be connected to the forward end of the piston to be used for dispensing bulk caulking material from a cartridge barrel, a further object being to provide a sealing ring member for the above purpose which may be easily attached without the use of screw threads or the like.

Another object of the invention is to provide a new and novel muzzle assembly for the front end of the gun which is quickly and easily operated by a simple turning operation and which is securely locked to the forward end of the barrel to protect it when it is operating under relatively high operating pressure.

Another object is to provide a new and novel holdback spring means for retaining the piston rod in its advanced position, said holdback spring means being positioned and arranged in such manner that it is readily mounted on the piston rod by merely dropping the same thereon, the construction and arrangement of the spring providing for its proper seating on the piston rod.

These and other objects will be apparent during the course of the following specification.

In the drawings forming a part of this specification:

FIG. 8 is a transverse section through the caulking gun illustrated in FIG. 4 at the forward end thereof, taken on the line 8—8 of FIG. 4;

FIG. 9 is a partial outer view of the device shown in FIG. 8 taken on the line 9—9 of FIG. 8; while

Figure 1:
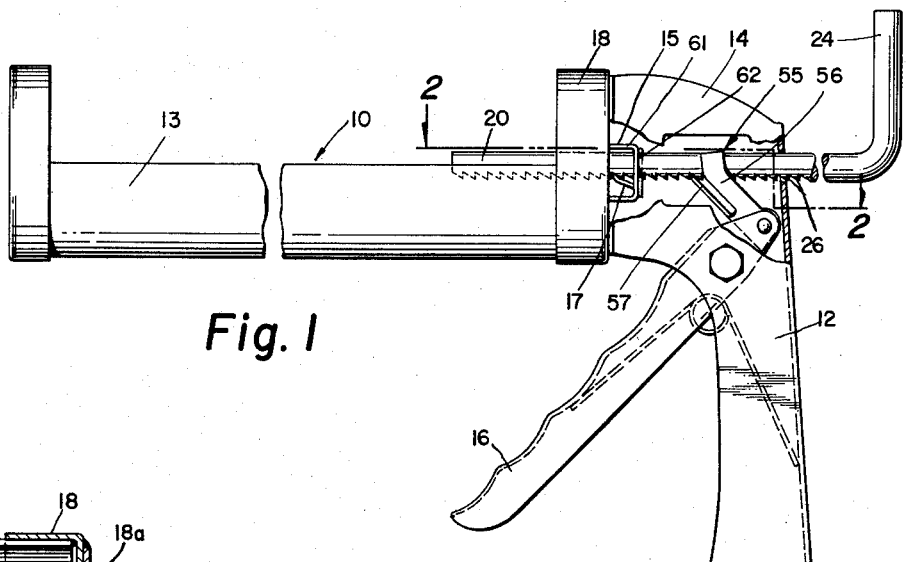
FIG. 1 is an elevational view with parts broken away of a manually operated caulking gun having a half barrel which is adapted to use caulking material contained in a cartridge.
Figure 4:
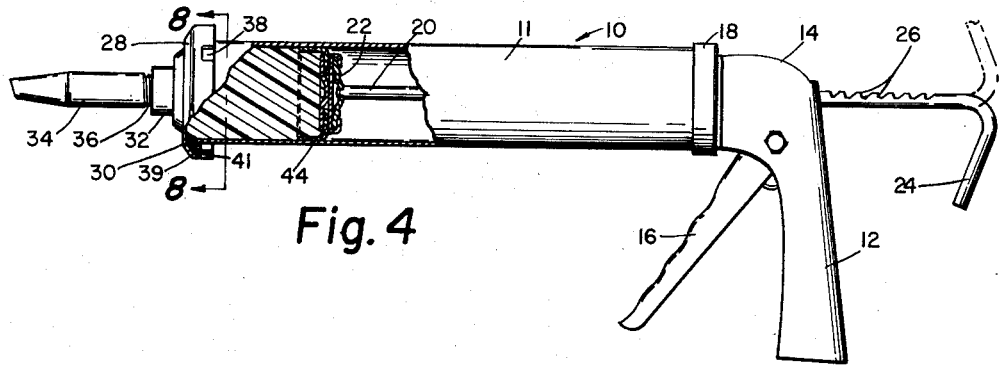
FIG. 4 is an elevational view of a caulking gun using a full size barrel and including a nozzle at the forward end thereof, parts being broken away to illustrate its use with bulk caulking material.

In the drawings, the numeral 10 refers generally to my new and improved caulking device comprising a cylindrical barrel 11 as illustrated in FIG. 4, or a one-half cylindrical barrel 13 as illustrated in FIG. 1, the caulking gun 10 being provided with a hand grip 12 having a flanged upper portion 14 disposed rearwardly of the barrel, and a hand lever or trigger 16 for advancing a piston rod forwardly in a well known manner. The barrels of either type disclosed herein are connected to the flanged portion 14 of the gun by means of a cup member 18 permanently secured thereto as by welding or brazing, and providing a transverse end wall 18a.

Figures 6, 7:
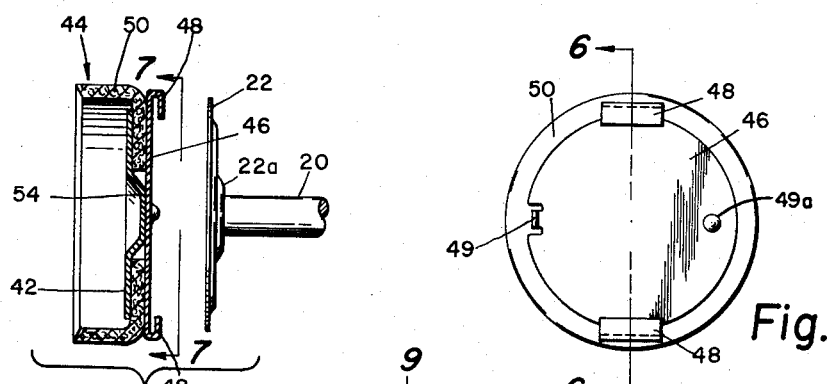
FIG. 6 illustrates the detachable sealing member in section and the forward end of the piston rod and piston in elevation.
FIG. 7 is a rear view of the detachable sealing member taken on the line 7—7 of FIG. 6.
Figures 8, 9:
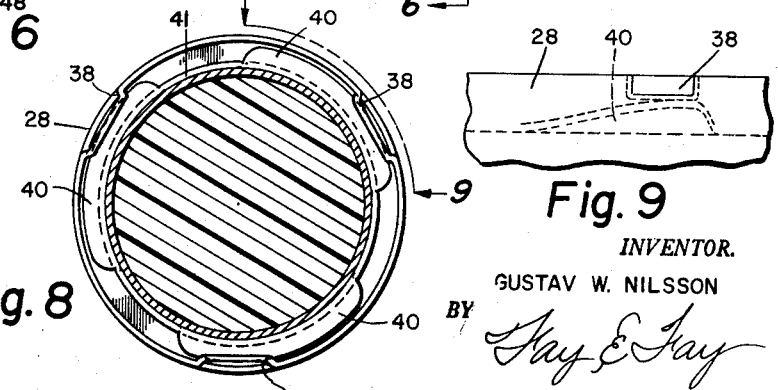

A plunger mechanism carried by the handle assembly comprises a reciprocally mounted piston rod 20 carried through cooperating apertures in the handle and inner wall of the cup member, the rod 20 being mounted therein in such manner that it is also rotatable in said apertures. A circular piston 22 mounted on the forward end of the piston rod 20 includes a central ridge portion 22a, as illustrated in FIG. 6, the piston 22 being secured to the piston rod 20 by means of a rivet. The opposite end of the piston rod 20, hereinafter referred to as the rearward end, is provided with a handle portion 24 providing a hand grip for turning the rod, while a series of ratchet teeth 26, as disclosed in FIGS. 1 and 4, are disposed along one side of the rod, said teeth being adapted to be engaged by a suitable trigger mechanism for forcing the piston rod 20 forward and thus forcing outwardly caulking material contained in the gun at the forward end thereof.

The forward end of the barrel 11 is provided with a muzzle cap 28 which is adapted to be detachably secured thereon. The cap 28 includes a central boss portion and an outer end portion 32 having internal threads adapted to engage with a cooperating threaded portion 36 of a nozzle 34 through which the caulking material is forced. The rearward end or skirt portion of the muzzle cap 28 is provided with a plurality of spaced recesses or dimpled portions 38, while the forward end of the barrel 11 is provided with a stamped breech lock ring 39 having a flat body portion 41 suitably secured thereto by a press fit or welding, while a plurality of spaced radially extending, integrally formed flanges 40 project outwardly therefrom. A gasket 30 is provided on the inner wall of the muzzle cap 28 along the surface which engages the forward end of the barrel. The dimpled portions 38 of the muzzle cap 28 are adapted to fit between the flanges 40 of the breech ring 39 in order that the muzzle cap may be slid rearwardly along the forward end of the barrel to seat against the gasket 30 at the forward end of the barrel 11, whereupon rotation of the muzzle cap 28 will cause the cap to be locked thereon by the co-operation of the recessed portions 38 of the cap 28 forming a locking assembly with the rearward side of the flanges 40 of the breech ring 39. Thus it will be obvious that the dimpled portions of the cap 28 can be readily attached to and detached from the forward end of the barrel 11 by a simple turning operation and that such locking means are a type of bayonet locking means, providing a secure locking together of the parts.

The lock ring 39 may be readily stamped from a solid sheet of material and is adapted to be permanently secured to the forward end of the barrel 11 by a simple welding operation. The use of such a ring provides a much better construction than the sealing means conventionally used at the forward end of a barrel where the material of the barrel is bent or rolled to form a breech lock means, the same being readily operated by means of a simple turning movement.

Figures 5, 10:
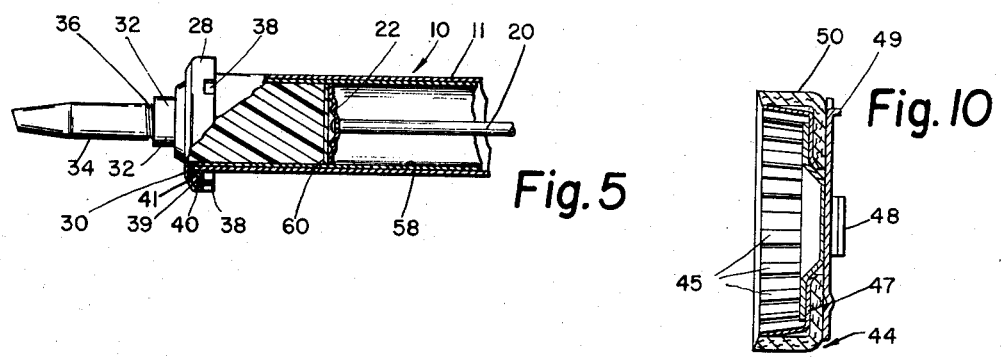
FIG. 5 is a view of the forward end of a caulking gun shown partly in elevation and partly in section, illustrating its use with cartridge material.
FIG. 10 is a central transverse section through a modified form of sealing member.

FIG. 5 illustrates the use of the piston rod in a barrel when a material in a cartridge is being dispensed, the side walls of the cartridge being indicated at 58 while the rear wall of the cartridge indicated at 60 is being compressed by the piston 22. When a caulking material disposed in a cartridge is used in a gun, no particular sealing means are required on the piston as it moves along the inner wall of the cartridge, the outer diameter of the piston and the inner diameter of the cartridge container usually being within an area causing a tight fit between said parts and, in some instances, the cartridge plunger end is cup-shaped so that it seals as it moves forward.

When bulk caulking material is being used in the caulking gun, as illustrated in FIG. 6, a sealing ring 44 is provided, the same being detachably secured to the forward end of the piston 22. The sealing ring 44 comprises a washer plate 46 disposed at the rearward surface thereof, which includes lugs 48 disposed along its outer periphery on the rearward surface thereof. A flexible sealing ring 50, formed of suitable material, such as leather, rubber, or neoprene, is retained against the washer plate 46 by a retainer plate 42 having a projecting center portion 54 which is welded or otherwise secured to the washer plate 46. A locking clip 49 formed by bending rearwardly a portion of the washer plate 46 along its periphery between the lugs 48 provides means for preventing transverse slippage of the piston mounted therein. In certain instances, it may be advantageous to provide a rearwardly extending boss 49a on the rear surface of the washer plate 46 to maintain a slight frictional pressure against the forward face of the piston 22.

As illustrated in FIG. 10, a series of fingers 45 extending outwardly from a member 47 may be suitably retained in place between the retainer plate 42 and the washer plate 46. The fingers 45 are directed forwardly of the sealing ring 44 for holding the flexible sealing ring 50 in position against the inner walls of the barrel as the piston 22 is advanced forwardly. When the caulking gun is using bulk caulking material, the piston 22 is caused to be seated between the lugs 48 of the plate 46 until it is seated against the lock clip 49, and when the parts are thus assembled, the sealing ring 44 is securely mounted on the forward end of the piston 22. Obviously, the sealing ring 44 may be readily detached from the washer plate 46 by moving it from its locking engagement within the locking clip 49 of the washer plate 46.

Figure 2:
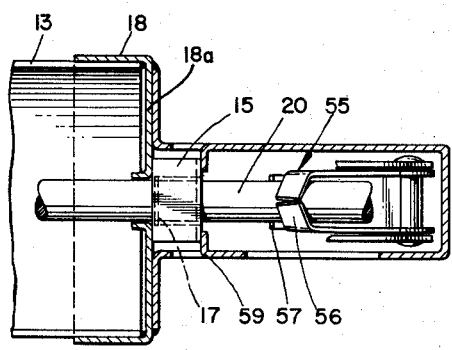
FIG. 2 is a sectional view taken on the line 2—2 of FIG. 1.
Figure 3:
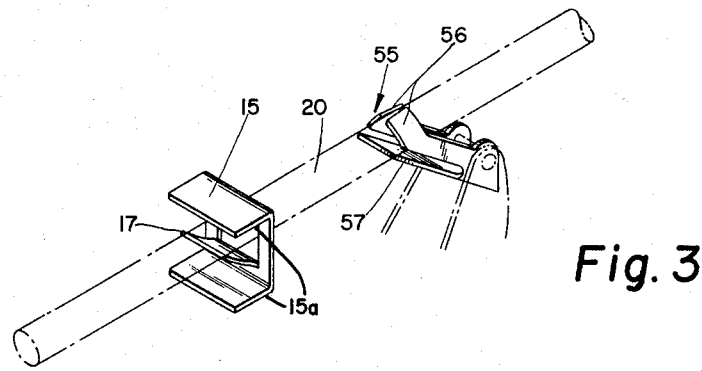
FIG. 3 is a view of a portion of the piston rod illustrating the position of the holdback spring thereon and the driving means for operating the piston rod.

As illustrated in FIGS. 1, 2 and 3, a holdback spring 15 is provided, the same including an upwardly extending dog 17 adapted to engage the ratchet teeth 26 of the piston rod 20 when the ratchet teeth are along the lower surface thereof, as illustrated in FIG. 1. The dog 17 may be formed by a stamping operation from a thin sheet of material by bending the dog 17 outwardly as shown in FIG. 3. By providing the holdback spring 15 having the built-in dog 17, it is possible to provide a construction whereby the side members of the holdback spring 15 hold the dog 17 in position in relation to the piston rod 20 and the dog 17 will be in contact with the plunger rod 20 at all times. A substantial advantage of this construction is that the spring 15 may be dropped onto the piston rod 20 at the time of assembly, where it will be seated upon the piston rod 20 at the rearward end of the barrel, this arrangement of parts resulting in a substantial saving in manufacturing costs. The upper and lower edges of the holdback spring are provided with generally parallel forwardly bent legs 15a, which abut the transverse end wall 18a when the holdback spring is in position.

The piston rod 20 is prevented from rearward movement by the holdback spring 15, mounted in the flanged portion 14 at the rear of the barrel 11, which is prevented from longitudinal movement along said piston rod by stop members 59. The top wall 61 of the spring 15 rests on the piston rod 20, while its side walls 62 are disposed along the sides of the rod 20. The dog 17 disposed between the side walls 62 projects forwardly and upwardly and engages the ratchet teeth 26 to prevent rearward movement of the piston rod 20.

The caulking gun 10 is operated by means of the pivoted trigger 16 operatively connected to the piston rod 20 by means of dog member 55 pivotally mounted at the upper end of the trigger 16, and having arms 56 embracing the sides and top of the piston rod 20 and a forwardly extending ratchet tooth-engaging member 57, engaging the ratchet teeth 26 in such manner that as the trigger is moved rearwardly by the operator's hand, it advances the piston rod 20 forwardly in the barrel 11 to force the material out of the forward end of the barrel.

The muzzle cap 28 is releasably fastened to the forward end of the barrel 11 by locking it to radially extending flanges 40 around the outer periphery of the barrel through the co-operation of the recessed portions 38 formed around the rearward edge of the cap 28, thereby forming a bayonet type of locking means permitting the cap to be readily attached in such manner that it will withstand the operating pressures to which it is subjected.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

I claim:

1. In a caulking gun of the type including an elongated barrel adapted to contain caulking material, and a piston rod having a piston mounted on its forward end and movable forwardly in said barrel for forcing caulking material out of the forward end of said barrel, the improvement comprising a sealing ring adapted to be frictionally connected to the forward side of said piston, said ring being radially detachable from said piston and comprising a flat plate provided with spaced locking lugs extending rearwardly and downwardly from its outer periphery for locking said ring to said piston, lock clip means extending rearwardly from said flat plate adjacent the outer edge thereof, said lock clip means being peripherally spaced from said locking lugs for abutment with the edge of said piston to prevent transverse slippage of the piston relative to said flat plate, a boss positioned on said flat plate substantially opposite said lock clip means and extending rearwardly of said plate to engage and maintain a slight frictional pressure on the piston, and flexible sealing means retained centrally against the forward wall of said flat plate, said flexible sealing means including a central portion clamped to said plate and a portion extending forwardly from said central portion along its outer periphery for sealing against the inner surface of said barrel.

2. Holdback means for a caulking gun piston rod having ratchet teeth and being adapted to be moved in a work performing direction relative to a caulking gun body, said holdback means comprising spring means formed from sheet material, said spring means including spaced side walls adapted to be disposed along the side surfaces of said piston rod, spaced top and bottom walls connecting said side walls at the top and bottom portions thereof respectively, and a dog adapted to engage said ratchet teeth on the piston rod, said dog being bent outwardly from a portion of the material of said spring means disposed between said side walls between the top and bottom walls, and means separate from said dog for preventing axial displacement of said holdback means in the work performing direction of movement of said piston rod.

3. Holdback means of the character indicated in claim 2, wherein said means separate from said dog includes a pair of legs extending substantially axially of said piston rod on opposite sides thereof and engaging said caulking gun body.

4. Locking means for sealing the forward end of the barrel of a caulking gun of the type including a closed barrel having a piston mounted on the forward end of a piston rod reciprocally mounted in the barrel for dispensing caulking material out of the forward end of the barrel, said locking means comprising a locking ring extending circumferentially around the outer surface of the forward end of said barrel and permanently fixed to and reinforcing the forward end of the barrel, said ring including an annular portion lying along said outer surface and having a plurality of radially outwardly and circumferentially spaced apart barrel lugs extending therefrom, said barrel lugs being spaced rearwardly from the forwardmost edge of said forward end of the barrel and having rear surfaces inclined with respect to the axis of the locking ring, and a co-operating cap member including a rearwardly extending portion adapted to be engaged around the forward end of said barrel, said rearwardly extending portion including a plurality of radially inwardly extending cap lugs spaced apart about the periphery thereof, said cap lugs being adapted to pass between said barrel lugs and ride along said inclined surfaces, when said cap member is rotated, to lock the said cap member around the forward edge of said barrel.

5. In a caulking gun of the type including an elongated barrel adapted to contain caulking material, and a piston rod having a piston mounted at its forward end and movable forwardly in said barrel for forcing caulking material out of the forward end of said barrel, the improvement comprising a sealing ring adapted to be frictionally connected to the forward side of said piston, said ring being radially detachable from said piston and comprising a flat plate provided with spaced locking lugs extending rearwardly and downwardly from its outer periphery for locking said ring to said piston, said plate further being provided with a boss projecting rearwardly of the plate for engaging and maintaining a slight frictional pressure on the piston, flexible sealing means retained centrally against the forward wall of said flat plate and extending around the outer periphery of said plate, the diameter of said flexible sealing means being such that it forms a tight fit with the inner surface of said barrel, and lock clip means extending rearwardly from said flat plate adjacent the outer edge thereof, said lock clip means being peripherally spaced from said locking lugs for abutment with the edge of said piston to prevent transverse slippage of the piston relative to said flat plate.

6. The improvement described in claim 5 in which the flexible sealing means includes a flat central portion clamped to said plate and a portion extending forwardly from said central portion along its outer periphery for sealing against the inner surface of said barrel.

7. The improvement device described in claim 6 in which the flexible sealing means includes a cup-shaped member having axially extending portions for biasing said forwardly extending portion into resilient sealing contact with said barrel.

References Cited in the file of this patent

UNITED STATES PATENTS

| | | |
|---|---|---|
| 300,011 | Ritchie et al. | June 10, 1884 |
| 1,489,262 | Martin | Apr. 8, 1924 |
| 1,503,087 | Brown | July 29, 1924 |
| 1,606,511 | Carson | Nov. 9, 1926 |
| 1,967,664 | Dick | July 24, 1934 |
| 2,102,939 | Bishop | Dec. 21, 1937 |
| 2,530,359 | Peterson | Nov. 14, 1950 |
| 2,534,857 | Crewe | Dec. 19, 1950 |
| 2,626,731 | Ekins | Jan. 27, 1953 |
| 2,646,906 | Jones et al. | July 28, 1953 |
| 2,720,345 | Slobin | Oct. 11, 1955 |
| 2,732,102 | Ekins | Jan. 24, 1956 |
| 2,768,768 | Cornell et al. | Oct. 30, 1956 |
| 2,784,603 | Collins | Mar. 12, 1957 |
| 2,786,604 | Collins | Mar. 26, 1957 |
| 2,792,170 | Hudson et al. | May 14, 1957 |
| 2,815,151 | Collins | Dec. 3, 1957 |
| 2,936,184 | Epstein | May 10, 1960 |